United States Patent

[11] 3,609,012

[72] Inventor Chan Street
 El Segundo, Calif.
[21] Appl. No. 864,117
[22] Filed Oct. 6, 1969
[45] Patented Sept. 28, 1971
[73] Assignee Spindler & Sauppe, Inc.
 Glendale, Calif.

[54] OPTICAL CONDENSING SYSTEM WITH VARIABLE EFFECTIVE FOCAL LENGTH
 12 Claims, 6 Drawing Figs.

[52] U.S. Cl. .................................................... 350/189
[51] Int. Cl. .................................................... G02b 3/04
[50] Field of Search ........................................ 350/189

[56] References Cited
 UNITED STATES PATENTS
 2,637,242 5/1953 Osterberg et al. ............ 350/189
 3,472,577 10/1969 Rosin et al. .................. 350/189

Primary Examiner—David Schonberg
Assistant Examiner—Paul A. Sacher
Attorney—Sellers and Brace ABSTRACT: A versatile optical condensing system readily convertible for use with projection lenses covering a wide range of focal lengths, as 35 to 250 mm. using a common group of lenses by themselves or in combination with a selected one in a second group of lenses. This system is characterized by its simplicity, compactness, highly uniform light intensity, minimal chromatic abberation and ability to hold the image size of the light source to a minimum at the entrance pupil of the projection lens to avoid the need for costly high-speed projection lenses. The basic lens system utilizes three lens the second and third of which each have one aspheric surface designed with controlled spherical abberation and so that the light rays passing between these two aspheric surfaces are substantially parallel to the optical axis. This feature makes it feasible to vary the axial spacing of these two lenses as necessary to accommodate the basic lens system for optimal use wit a selected supplemental condensing lens and one of several projection lenses of differing focal lengths. The invention makes it possible to manufacture of wide range of condensing system sizes at very substantial cost savings using a minimum number of variable components.

PATENTED SEP 28 1971 3,609,012

INVENTOR
CHAN STREET
BY
ATTORNEYS

OPTICAL CONDENSING SYSTEM WITH VARIABLE EFFECTIVE FOCAL LENGTH

The present invention relates to optical condensing systems, and more particularly to a unique, highly versatile system readily convertible for use with projection lenses of any of a wide range of focal lengths.

Optical condensing systems of a wide variety of constructions have been proposed heretofore using various arrangements and combinations of optical components and having as objects an improved more efficient more uniformly lighted field and producing less distortion and minimized chromatic aberration. Many of these condensing systems have been quite successful in achieving some of these objectives but are subject to certain shortcomings and disadvantages sought to be avoided by the present invention. For example, many of these prior systems have been unduly complex and utilize an excessive number of optical components adding greatly to the cost and inherently subject to excessive loss in the quantity of transmitted light from the light source. A particular disadvantage and shortcoming of prior condensing systems is the fact that each is specifically designed for a particular focal length projection lens without any provision or capability of conversion for use with projection lenses of other focal length. Previous aspheric condensing lens systems have been typically designed for essentially zero spherical aberration. This has constrained these systems to the use of a particular lamp source filament area, a particular system focal length, and fixed spacing of the lens elements.

It is therefore a primary object of the present invention to provide a greatly improved optical condensing system the major components of which can be used interchangeably and in a manner to provide a wide range of condensing systems usable with projection lenses having widely differing focal lengths and encompassing, for example, a range between 35 and 250 millimeters. This capability is achieved by introducing and controlling deliberate spherical aberration with controlled ray path and distribution using two groups of optical components, one group of which is usable universally with the full range of projectors, either by themselves for one particular focal length or in combination with a selected optical component from the second group thereof for respective ones of other projection lenses. Desirably, but not necessarily, one of the universally used optical components and a selected one of the elective optical components is mountable in a common support specially designed for use with that particular elective component. This expedient provides assurance that all components of a chosen condensing system will be assembled in their precise proper relative positions.

Accordingly it will be understood that the invention contemplates a condensing system suitable for projection lenses of focal lengths ranging between 35 and 250 mm. utilizing a first group of three optical elements, two of which are always supported in the same mounting means and the third of which is mountable in one of a series of mounting supports, either by itself or with a selected one of a group of supplemental optical elements depending upon the desired focal length of the projection lens. The design constants of all optical elements are precisely matched when assembled in a selected one of the various possible operating combinations and each system provides substantially identical results comparable to, if not surpassing, the performance of the best commercial condensing system for use with a projection lens of designated focal length.

It is therefore a primary object of the present invention to provide a unique optical condensing system utilizing a minimum number of specially designed components selectively usable in combination with one another to provide different specific condensing systems for use with a projection lens of a related specific focal length.

Another object of the invention is the provision of an improved optical condensing system utilizing a minimum of optical elements and characterized by its unusual efficiency and superior operating characteristics.

Another object of the invention is the provision of a unique optical condensing system utilizing a minimum of optical elements compactly arranged and featuring uniform luminous intensity throughout the area of the objective plane of the projection lens, the highest practical pickup angle from the light source, and providing minimum chromatic aberration.

Another object of the invention is the provision within its design principles of means to provide at the film gate luminous intensity distributed in accordance with a smoothly ordered function as, for example, a sine distribution, providing uniform luminous intensity from a source having a fall-off varying as the cosine of the angle measured normal to the optical axis.

Another object of the invention is the provision of a versatile optical condensing system readily assembled from a minimum number of components for use in systems of a range of focal lengths and including two lenses each having one aspheric surface designed with controlled spherical aberration and so that light rays passing therebetween are essentially parallel to the optical axis thereby permitting these two lenses to be shifted along the optical axis as necessary for their optimal use with different selected supplemental condensing lens.

Another object of the invention is to provide controlled illumination over all portions of an associated projection aperture.

Another object of the invention is the provision of a condensing system accommodating axial adjustment of one of the two lenses having an aspheric surface thereby to permit the insertion of a selected supplemental lens to adjust the focal length to match the requirements of a selected projection lens.

A further object of the invention is to control the light path through the condensing system so as to eliminate the need for large aperture costly projection lenses.

Another object of the invention is the provision of a condensing system using aspheric lens shapes having less power at their centers and which, in consequence, are thinner, easier to cool and less costly.

Another object of the invention is the provision of a high performance, high efficiency optical condensing system utilizing a minimum number of optical components selectively usable in different combinations to provide a light projection system readily convertible for use with a plurality of projection lenses of different specific focal lengths.

These and other more specific objects will appear upon reading the following specification and claims and upon considering in connection therewith the attached drawings to which they relate.

Referring now to the drawings in which a preferred embodiment of the invention is illustrated.

Figure 1:
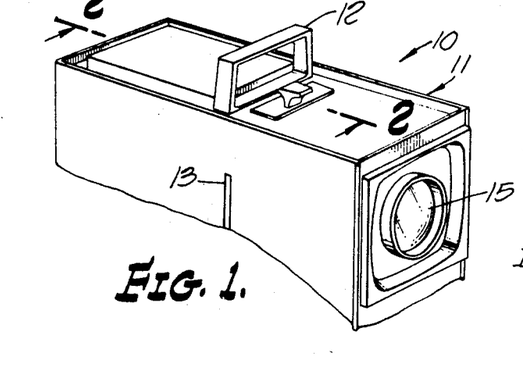
FIG. 1 is a fragmentary perspective view of a suitable housing enclosing the projection lamp and lens system embodying the present invention.
Figure 2:
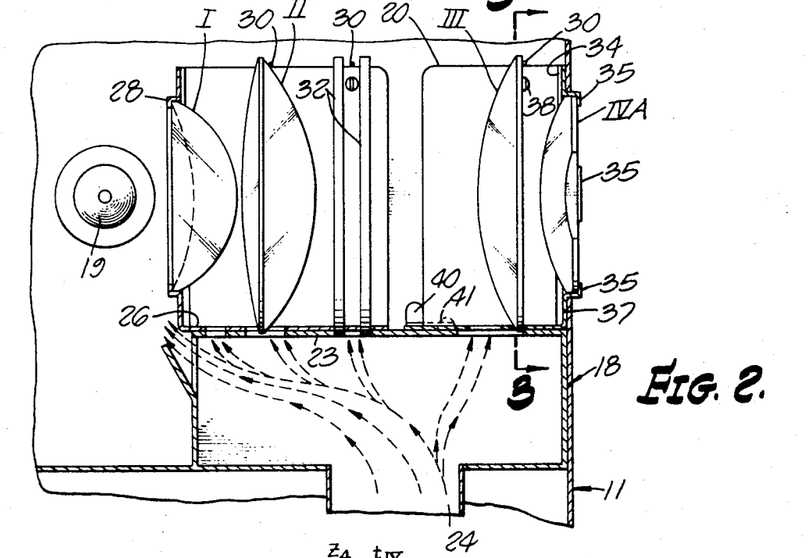
FIG. 2 is a fragmentary cross-sectional view on an enlarged scale taken along line 2—2 on FIG. 1 showing a condensing lens system as assembled for use with a projection lens of 35 millimeters focal length.
Figure 3:
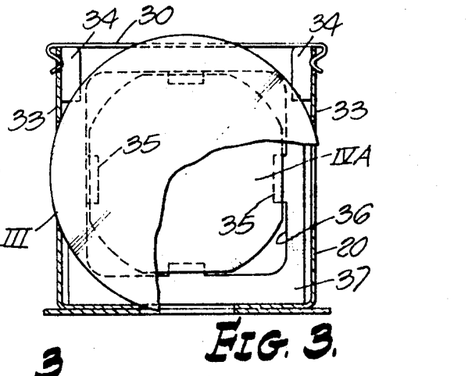
FIG. 3 is a fragmentary cross-sectional view taken along line 3—3 on FIG. 2.

Referring initially and more particularly to FIGS. 1, 2 and 3, there is shown a typical embodiment of the invention projection lens system, designated generally 10, with the lens components assembled for use with an f2.5 projection lens of 35 mm. focal length. The projection lamp and lens system is enclosed within any suitable main housing 11 provided with a carrying handle 12 and having aligned slots 13 in its sidewalls for film in either strip form or mounted in carrier frames in accordance with customary practice. The lens system is particularly suitable for use in projecting transparent slides having standard dimensions utilized in both commercial and home projectors. Typically, the slides have formats commonly referred to as double frame measuring 35×23 mm. The system is also suitable to project the super slide format measuring 38× 38 mm. The projection lens 15 is adjustably supported in an opening at the front of housing 11.

Figure 4:
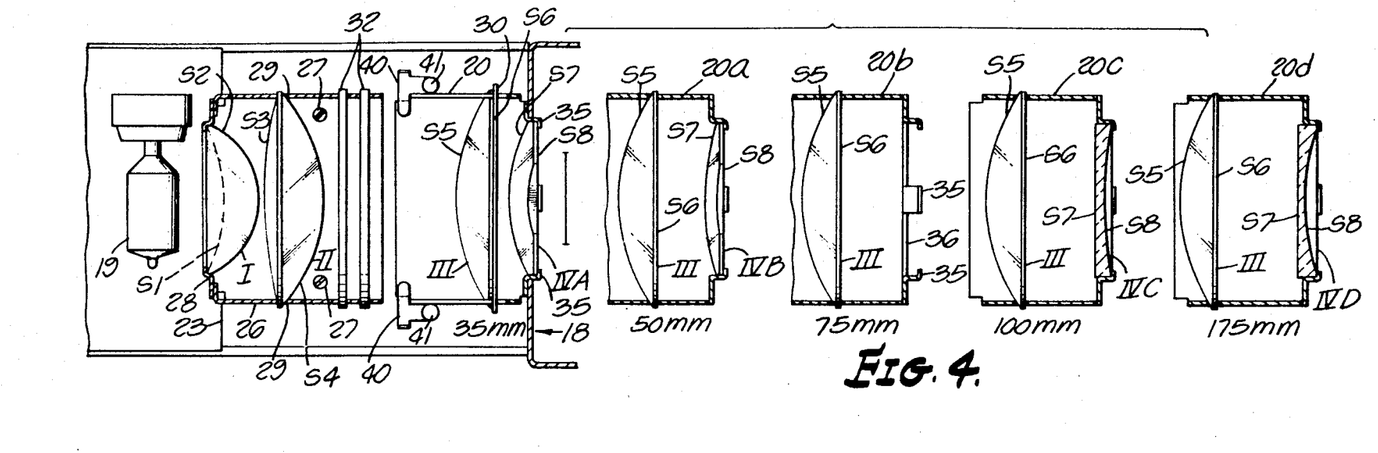
FIG. 4 is a cross-sectional view taken in part along a transverse horizontal plane through the optical axis of the lens system and showing one supplemental lens unit in place and four alternate lens units in readiness for assembly in lieu of the third and fourth lenses employed in the 35 mm. focal length assembly.

As is best shown in FIGS. 2 and 3, main housing 11 encloses suitable rigid support structure 18 interiorly thereof for supporting a projection lamp 19 and the readily convertible condensing lens system. This condensing system comprises, as basic optical elements, lenses I, II and III which may be used alone or in combination with a selected one of the supplemental lenses IV A, IV B, IV C and IV D (FIG. 4). As herein disclosed by way of example, lenses I, II and III, when used alone, are designed to be compatible with a 75 mm. projection lens and are firmly assembled in the manner illustrated in FIG. 5. However, when the projector is assembled for use with a projection lens having a focal length other than 75 mm., collective lens III and a selected one of the supplemental lenses IV A, IV B, IV C, IV D etc. are assembled for use in combination with lenses I and II using an appropriate common carrier for lens III and the selected supplemental lens. Conversion from one condensing system to another is accomplished by selecting a particular one of the supplemental lenses and mounting this lens along with lens III in a selected one of the one-piece lens mount 20, 20a, 20b, 20c, 20d, following the simple technique to be described presently.

Referring now to FIGS. 2 and 4, it will be understood that subframe 18 enclosed by housing 11 includes a transverse bracket 23 provided with numerous cooling air ports for directing cooling air from a supply passage 24. This cooling air is directed over the forward and rear faces of the various lens elements to cool the same in accordance with customary practice. Condensing lenses I and II are mounted in a common lens mount 26 comprising a U-shaped sheet metal member anchored to bracket 23 as by screws 27. Lens I is mounted in an upright ring 28 bent upwardly from the bottom or bight portion between the upright legs of lens mount 26. The sidewalls of mount 26 are apertured as indicated at 29 in FIG. 4 to receive the diametrically opposed marginal edges of lens II, the sidewalls of the lens mount being flexible to permit insertion of the lens following which the sidewalls are held pressed against the edges of the lens by spring keeper clip 30. A pair of heat filters 32,32 are similarly held in place in front of the forward face of lens II.

The lens mounts 20, 20a, 20b, 20c, 20d are similar to the U-shaped lens mount 26 just described but differ from one another primarily only in the spacing of the support slots for the basic lens III from the support for the supplemental lens. Thus mount member 20 includes upright resilient sidewalls 33,33 having inturned tangs 34 at their upper forward corners which cooperate with tangs 35 projecting inwardly from a generally rectangular opening 36 in the front end wall 37 of mounting member 20. When the spring keeper clip 30 is detached from it normal assembled position crosswise of the upper edges of sidewalls 33,33 the latter walls can be flexed outwardly away from one another permitting a selected one of the supplemental lenses to be inserted between tangs 34,35. This having been done, end wall 36 is flexed upwardly and keeper 30 is pressed into assembled position with its inturned ends seated in openings 38 (FIG. 2).

Each of the sidewalls 33 of members 20 are also notched in transversely aligned relationship to receive the marginal edges of lens III. Lens III is held locked in assembled position by keeper 30. However, the spacing of the assembly slots for lens III differs as respects the spacing of these slots axially from the interior transverse face of tangs 35 and depending upon the particular supplemental lens to be used.

Preferably, a separate lens mount 20 is constructed for each different focal length optical system in order to safeguard against the possibility of lens III being assembled in an improper operating position relative to the other lenses of the system. However, it is within the scope of the invention to use a common lens mount 20 having its sidewalls 33 pierced with multiple sets of aligned mounting slots for lens III, there being a particular set for the entire range of focal lengths for which supplemental lenses are available. In this case, the assembler or operator must exercise due care in selecting the appropriate set of mounting slots for the lens III.

The means for detachably securing the lens mount for elements III and IV in place is best shown in FIGS. 2 and 4. Thus, the upright wall of subframe 18 is apertured to receive tangs 35 of each of the lens mounts with the transverse lower wall of the mounts seated against bracket shelf 23. Mount 20 is held securely in this position with lenses III and IV aligned with the optical axis by means of a pair of keeper clips 40,40 pivoted to bracket 23 by shouldered rivets 41. When keepers 40 are rotated to the position shown in FIG. 4 they seat firmly against the rear edge of the bottom wall of mounts 20 and anchor the same firmly and accurately in position. Rotating the keepers away from one another about rivets 41 releases the mounting units 20 for removal either for servicing or to convert the projector to a different focal length.

Referring now to the details of the versatile readily convertible optical condensing system, it will be understood that the optical components include the basic lens elements I, II and III which comprise a complete condensing system for a selected focal length system and which are used in combination with a selected one of a series of supplemental lenses such as lenses IV A-D when desiring a system of different focal length. These optical elements are specifically designed to provide an illuminating system having superior characteristics over the entire range of projector focal lengths between 35 and 250 mm.

A principal problem involves a design providing a high degree of even illumination over the entire surface of the film area. This objective is achieved by the present lens system using the highest reasonable pickup angle from the slight source of 100° and with the optical elements confined approximately within a maximum axial distance of about 6 inches. Chromatic aberration and color fringing is reduced to a point such that it does not interfere with the proper rendering of color transparencies. The reduction in light intensity source, as viewed at high input angles, is compensated for to provide, as near as practical, uniform illuminous intensity at the film plane and the image size of the light source at the entrance window of the projection lens is minimized to avoid the need for an extremely high-speed projection lens.

It is well known that most filament lamps exhibit a falloff in luminous intensity which varies as the cosine of the angle measured from a plane normal to the filament. In principle, filament lamps exhibit a falloff of luminous intensity as the cosine of the angle as measured normal to the filament plane. This is generally true in the plane parallel to the filament axis which for most projection systems would be the vertical plane. This falloff pattern is not true for the plane at right angles to the filament axis. This is due to the nesting of the helical filaments in two different planes. This results in a loss of illumination to the system at higher angles in a horizontal plane. If only the normal cosine falloff is to be considered, even illumination would be achieved by a correction in proportion to the sine of the pickup angle. This correction will, in principle, give even illumination on the plane parallel to the filament axis of the system, but since the angular falloff on the plane at right angles to the filament axis is greater than the cosine, it will not fully compensate in this plane. To achieve a reasonable flat field for a filament lamp then requires either a cylindrically corrected system whose cost would be prohibitive, an additional cylinder correcting lens, or a compromise between the amount of correction required between the vertical and horizontal plane. The latter approach is the one used in the present system.

Figure 5:
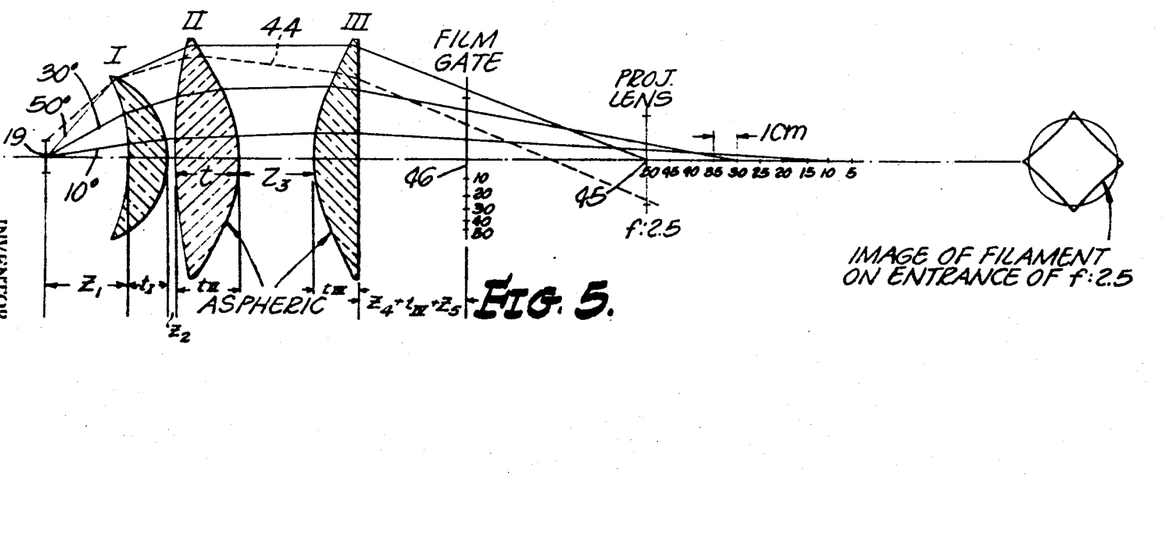
FIG. 5 is a diagrammatic view of the basic components of the invention lens system for a projection lens having a focal length of 75 mm. and showing the deviation paths of three typical rays leaving the lamp filament at 10°, 30° and 50° to the optical axis.
Figure 6:
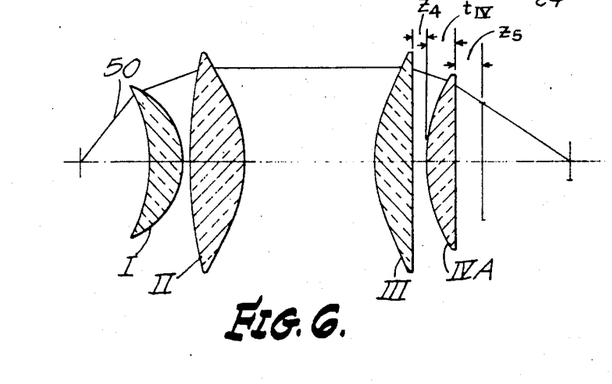
FIG. 6 is a diagrammatic view generally similar to FIG. 5 showing the lens system assembled for use with a projection lens of 35 mm. focal length and showing the path of marginal 50° ray.

The design principles utilized to carry out the foregoing criteria for illustrated diagrammatically in FIG. 5 showing the basic elements of the invention lens system for use with a 75 mm. projection lens. The design principles will now be described.

As a convenient design criteria the marginal 50° ray was caused to intersect the optical axis at the nodal point of the projection lens which point is spaced 75 mm. from the film plane, and with this ray passing through the diagonal corner of the film aperture. With a given diameter for lens element III it is known that its surface S6 must be spaced at a certain distance from the film gate for the 50° ray just referred to to impinge upon surface S6 near its outer rim. The spacing distance having been determined, the precise point of intersection of the 50° ray is known.

This system was designed to utilize the three basic elements I, II and III to bring the rim ray of the filament in focus 75 mm. from the film plane. If the aspheric surfaces S4 and S5 were so proportioned that all rays from the filament recombined on the axis at the 75 mm. point, then the power of the system near the axis would be great enough to deviate the off-axis filament rays, such as the dotted line ray 44 in FIG. 5, completely out of the entrance window of the projection lens. To avoid this, the optical axis forwardly of the focal point is divided into ordered increments representing the desired points of intersection of successive rays of smaller angle with the optical axis. The 5° increments there represented are spaced one centimeter apart but it will be understood they may be otherwise distributed. Only the 10° and 30° rays are shown in addition to the marginal ray at 50°. As one example, FIG. 5 shows a sine distribution of the rays at the film gate, these being represented in part by the points marked 10, 20, 30, 40 and 50 in FIG. 5. Rays drawn through the respective points of each section on the optical axis just referred to and the corresponding point of intersection with the film gate the intersect surface S6 at readily ascertainable points. With these ascertained points on surface S6 the designer is enabled to determine the corresponding points on surfaces S4 and S5 of lens elements II and III respectively to define an aspheric surface to cause the respective rays emanating from the light source to become coaxial with the respective points of surface S6 determined in the manner described in detail above. In other words, surface S4 of element II is designed to deviate the 50° ray toward lens element III and surface S5 of element III is likewise so designed to deviate that 50° ray to match the criterion established for the 50° ray between element III, the margin of the film plane, and the nodal point of the projection lens. The same technique is followed in ascertaining the aspheric surfaces S4 and S5 for each of the other rays between the marginal 50° ray and the optical axis.

The design technique described above provides a uniform luminous intensity or other smoothly ordered distribution function over the area of the film gate. It will therefore be apparent that if a different light distribution is desired, the same technique may be employed using a different mode of determining the point of penetration of the film plane by typical spaced control rays.

The described design principles and procedure may be performed in full, utilizing mathematical processing techniques or in part graphically and in part mathematically.

It will be understood that FIG. 5 represents the system with a 75 mm. projection lens focused on infinity with its nodal point spaced 75 mm. from film plane 46. The dotted line ray shown in FIG. 5 represents the path of a ray through the lens system and emanating from the extreme outer edge of the filament, it being noted that this ray falls slightly inside the entrance pupil of the projection lens. Hence, the reduction in power of the central portion of the lens tends to keep the light from border regions of the filament in a zone within the handling capabilities of the projection lens.

Fulfillment of the foregoing criteria, factors and requirements is achieved using the described three element basic condensing lens system for a projector assembly having a series of focal lengths extending over the range of 35 and 250 mm. Lens I has spherical surfaces, the entrance surface being concave and the exit surface being convex. The front entrance surface S3 of lens II is spherical whereas its exit surface S4 is aspherical. Lens III has an aspherical entrance surface S5 and a plano exit surface.

Table I sets forth the essential design constants of the several lens elements of the basic optical system illustrated in FIG. 5. All dimensions are in millimeters and the specified thickness of each lens is that measured along the optical axis.

TABLE I

| Lens element | Lens surface | Surface curvature, mm. | Axial thickness, $t$ (mm.) | Index of refraction, $n_D$ | Lens diameter, mm. |
|---|---|---|---|---|---|
| I | S1<br>S2 | −65.0<br>−31.0 | 13.0 | 1.520 | 56.0 |
| II | S3<br>S4 | +180<br>Aspheric (Equation I) | 22.12 | 1.520 | 82.0 |
| III | S5<br>S6 | Aspheric (Equation II)<br>Plano | 13.52 | 1.520 | 82.0 |

Aspheric Equation I:

$$X_{S4} = \frac{0.01587}{1+\sqrt{1-(0.01587y)^2}} - 0.334987y^2$$

$$\times 10^{-2} + 0.39637y^4 \times 10^{-5} - 0.391569y^6 \times 10^{-8}$$

$$+ 0.229311y^8 \times 10^{-11} - .485146y^{10} \times 10^{-15}$$

Aspheric Equation II:

$$X_{S5} = \frac{0.01388}{1+\sqrt{1-(0.01388y)^2}} - 0.677757y^2 \times 10^{-3}$$

$$+ 0.131434y^4 \times 10^{-5} - 0.139364y^6 \times 10^{-8} + 0.772189y^8$$

$$\times 10^{-12} - 0.178023y^{10} \times 10^{-15}$$

Axial distance from radiation source to S1 = 26.34 mm.
Axial distance from S2 to S3 = 2.5 mm.
Axial distance from S4 to S5 = 36.86 mm.
Axial distance from S6 to object plane = 39 mm.

In the foregoing Table I it will be recognized that the surface curvatures of the three lenses are set forth in the third column from the left. In the equations defining the surface contour of the two aspheric surfaces of lenses II and III, the X values represent a point on the aspheric surface measured along the optical axis and the Y values represent a corresponding point on the aspheric surface measured in a plane normal to that axis. These aspheric shapes embody the particular distribution function adopted as desirable for the film plane and the related axial intersection points representative of the invention principles but do not represent limiting conditions but merely one typical embodiment.

The essential design constants of the invention lens system adapted for use with projection lens of focal lengths both greater and less than that applicable to the basic three lens condensing system are set forth below in Tables II and III.

Each of the supplemental lens elements IV A to IV D has one plano surface and one spherical surface respectively, facing in the directions shown in FIG. 4. It will be understood that the several plano surfaces as well as the spherosity of surface S3 may be of different contour, these particular shapes having distinct advantages costwise and in ease of manufacturing:

Table II follows:

TABLE II

Supplemental Lens Data

| Lens element | Lens surface | Surface curvature, mm. | Axial thickness, t(mm.) | Index of refraction, $n_D$ | Lens diameter, mm. |
|---|---|---|---|---|---|
| IVA | S7 | +62.5 | 10.5 | 1.520 | 64.0 |
|  | S8 | Plano |  |  |  |
| IVB | S7 | +120.0 | 6.0 | 1.520 | 64.0 |
|  | S8 | Plano |  |  |  |
| IVC | S7 | Plano | 3.18 | 1.520 | 64.0 |
|  | S8 | +170.0 |  |  |  |
| IVD | S7 | Plano | 1.84 | 1.520 | 64.0 |
|  | S8 | +72.0 |  |  |  |

Table III below lists the axial spacings in millimeters between the surface of adjacent lens elements including the basic three lens system alone or when combined with any one of the illustrative supplemental lenses.

TABLE III

Lens Spacings for Typical Supplemental And Projection Lens Combinations

| Projection lens focal length (mm.) | Supplemental lens No. | Axial spacing, mm. | | | | |
|---|---|---|---|---|---|---|
|  |  | $Z_1$ | $Z_2$ | $Z_3$ | $Z_4$ | $Z_5$ |
| 35 | IV A | 26.34 | 2.5 | 49.36 | 6.50 | 10.00 |
| 50 | IV B | 26.34 | 2.5 | 41.36 | 18.50 | 10.00 |
| 75 | None | 26.34 | 2.5 | 36.86 | 39.0 | 0 |
| 100 | IV C | 26.34 | 2.5 | 33.36 | 26.75 | 12.57 |
| 175 | IV D | 26.34 | 2.5 | 28.36 | 30.50 | 15.16 |

Wherein Z is the axial spacing between lenses and between the film and the nearest lens surface.

In operation, lens I receives the full heat load of lamp 19 and should be constructed of a hardened tempered glass capable of operating in the region of approximately 400° C. Lenses II and III operate at lower temperatures and the heat filter 32 is usually placed between elements II and III and is effective to filter out the infrared region beyond 0.7 $\mu$. All lenses should have reasonably well finished surfaces as, for example, to 8 $\lambda$. It will be understood that the particular design constants set forth in tables I, II and III are those required for the particular focal lengths selected as illustrative of the principles of the present invention.

While the particular optical condensing system herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An optical condensing system comprising a plurality of optical elements in axial alignment with a source of luminous radiation, said system including a pair of lens elements having an aspheric surface on each thereof cooperating with one another and with the other surfaces of said lens elements to distribute consecutive rays of the source radiation relative to the optical axis in accordance with a smoothly ordered function over a prescribed area of a plane forwardly of and normal to the axis of said condensing system and characterized in that said lens elements are so shaped an disposed relative to one another and to the source of luminous radiation as to direct rays passing through said lens elements into intersection with the optical axis of said system at a multiplicity of points distributed in the same consecutive order over a substantial length thereof forwardly of said condensing system.

2. An optical condensing system as defined in claim 1 characterized in that said optical system includes a first condensing lens element between said radiation source and a first one of said pair of lens elements and spanning an arc of at least 90° with respect to the source of luminous radiation.

3. An optical condensing system as defined in claim 1 characterized in that the aspheric surfaces respectively present on said pair of lens elements are so shaped and positioned that rays located closer to the optical axis in the zone of said lens elements intersect the optical axis at points more distantly from said lens element than the points of intersection of rays passing through the outer portions of said lens elements.

4. An optical condensing system as defined in claim 1 characterized in that said pairs of lens elements are so shaped and spaced from one another relative to the source of radiation as to provide an ordered distribution of the source rays in the plane normal to the optical axis and forwardly of the nearest one of said lens elements.

5. An optical condensing system as defined in claim 1 characterized in the combination therewith of a projection lens forwardly of said pair of lens elements and in which said rays are distributed in a smoothly ordered function, and said multiplicity of points of ray intersection with said optical axis being forwardly of the nodal point of said projection lens.

6. An optical condensing system as defined in claim 5 characterized in that said condensing system is selectively convertible for use with differing focal length projection lenses, said condensing system including a supplemental lens between said pair of lens and the object plane upon which the projection lens is focused and cooperating with said pair of lens elements to vary the angle of said radiation source rays relative to said optical axis so as to shift their respective points of intersection with the optical axis thereby to adapt said condensing system for use with a projection lens of a different focal length without need for relocating the radiation source relative to the object plane.

7. An optical condensing system as defined in claim 6 characterized in that said additional lens element is a positive element effective to increase the angle of the respective source rays relative to said optical axis in passing therethrough thereby to adapt said condensing system to use with a projection lens of shorter focal length.

8. An optical condensing system as defined in claim 9 characterized in that said additional lens element is a negative element effective to diminish the angle of respective source rays relative to said optical axis in passing therethrough thereby to adapt said condensing system to use with a projection lens of longer focal length.

9. An optical condensing system as defined in claim 6 characterized in that said additional lens and the adjacent one of said pair of lens elements are spaced from the other of said pair of lens elements by a distance varying with and dependent upon the design constants of said additional lens elements.

10. A condensing lens system as defined in claim 2 characterized in that said lens elements are arranged along the optical axis in the numerical order and having the design parameters set forth in table I, namely:

Supplemental Lens Data

| Lens element | Lens surface | Surface curvature, mm. | Axial thickness, t(mm.) | Index of refraction, $n_D$ | Lens diameter, mm. |
|---|---|---|---|---|---|
| IVA | S7 | +62.5 | 10.5 | 1.520 | 64.0 |
|  | S8 | Plano |  |  |  |
| IVB | S7 | +120.0 | 6.0 | 1.520 | 64.0 |
|  | S8 | Plano |  |  |  |
| IVC | S7 | Plano | 3.18 | 1.520 | 64.0 |
|  | S8 | +170.0 |  |  |  |
| IVD | S7 | Plano | 1.84 | 1.520 | 64.0 |
|  | S8 | +72.0 |  |  |  |

11. An optical condensing system as defined in claim 10 readily convertible for use with projection lens of widely differing focal lengths and characterized in the provision of a set of supplemental lens usable selectively in combination forwardly of the third lens of the lens system defined in claim 20 and which supplemental lens have the design parameters and relationships to the lenses operatively associated therewith set forth in tables II and III, namely:

Lens Spacings for Typical Supplemental and Projection Lens Combinations

| Projection lens focal length (mm.) | Supplemental lens No. | Axial spacing, mm. | | | | |
|---|---|---|---|---|---|---|
| | | $Z_1$ | $Z_2$ | $Z_3$ | $Z_4$ | $Z_5$ |
| 35 | IV A | 26.34 | 2.5 | 49.36 | 6.50 | 10.00 |
| 50 | IV B | 26.34 | 2.5 | 41.36 | 18.50 | 10.00 |
| 75 | None | 26.34 | 2.5 | 36.86 | 39.0 | 0 |
| 100 | IV C | 26.34 | 2.5 | 33.36 | 26.75 | 12.57 |
| 175 | IV D | 26.34 | 2.5 | 28.36 | 30.50 | 15.16 |

12. A condensing lens system as defined in claim 10 characterized in the selective use therewith of one additional lens forwardly of lens III having the following constructional data:

| Projection lens focal length (mm.) | Supplemental lens No. | Axial spacing, mm. | | | | |
|---|---|---|---|---|---|---|
| | | $Z_1$ | $Z_2$ | $Z_3$ | $Z_4$ | $Z_5$ |
| 35 | IV A | 26.34 | 2.5 | 49.36 | 6.50 | 10.00 |
| 50 | IV B | 26.34 | 2.5 | 41.36 | 18.50 | 10.00 |
| 100 | IV C | 26.34 | 2.5 | 33.36 | 26.75 | 12.57 |
| 175 | IV D | 26.34 | 2.5 | 28.36 | 30.50 | 15.16 |

Wherein $Z_n$ is the axial spacing between lenses and between the film and the nearest lens surface.

UNITED STATES PATENT OFFICE
CERTIFICATE OF CORRECTION

Patent No. 3,609,012    Dated September 28, 1971

Inventor(s) Chan Street

It is certified that error appears in the above-identified patent and that said Letters Patent are hereby corrected as shown below:

Column 8, beginning with line 52, claims 10 and 11, "10.A condensing" cancel all to and including line 9 of column 9 and insert:

-- 10. A condensing lens system as defined in claim 2 characterized in that said lens elements are arranged along the optical axis in the numerical order and having the design parameters set forth in table I, namely:

| Lens Element | Lens Surface | Surface Curvature mm | Axial Thickness $t_{mm}$ | Index of Refraction $n_D$ | Lens Diameter mm |
|---|---|---|---|---|---|
| I | S1<br>S2 | -65.0<br>-31.0 | 13.0 | 1.520 | 56.0 |
| II | S3<br>S4 | +180<br>Aspheric (Equation I) | 22.12 | 1.520 | 82.0 |
| III | S5<br>S6 | Aspheric (Equation II)<br>Plano | 13.52 | 1.520 | 82.0 |

UNITED STATES PATENT OFFICE
CERTIFICATE OF CORRECTION

Patent No. 3,609,012          Dated September 28, 1971

Inventor(s) Chan Street          -2-

It is certified that error appears in the above-identified patent and that said Letters Patent are hereby corrected as shown below:

---

11. An optical condensing system as defined in claim 10 readily convertible for use with projection lens of widely differing focal lengths and characterized in the provision of a set of supplemental lens usable selectively in combination forwardly of the third lens of the lens system defined in claim 20 and which supplemental lens have the design parameters and relationships to the lenses operatively associated therewith set forth in Tables II and III, namely:

Supplemental Lens Data

| Lens Element | Lens Surface | Surface Curvature mm | Axial Thickness $t$(mm) | Index of Refraction $n_D$ | Lens Diameter mm |
|---|---|---|---|---|---|
| IVA | S7 S8 | +62.5 Plano | 10.5 | 1.520 | 64.0 |
| IVB | S7 S8 | +120.0 Plano | 6.0 | 1.520 | 64.0 |
| IVC | S7 S8 | Plano +170.0 | 3.18 | 1.520 | 64.0 |
| IVD | S7 S8 | Plano +72.0 | 1.84 | 1.520 | 64.0 |

UNITED STATES PATENT OFFICE
CERTIFICATE OF CORRECTION

Patent No. __3,609,012__  Dated __September 28, 1971__

Inventor(s) __Chan Street__  -3-

It is certified that error appears in the above-identified patent and that said Letters Patent are hereby corrected as shown below:

Lens Spacings for Typical
Supplemental and Projection
Lens Combinations

| Projection Lens Focal Length (mm) | Supplemental Lens No. | Axial Spacing mm | | | | |
|---|---|---|---|---|---|---|
| | | $z_1$ | $z_2$ | $z_3$ | $z_4$ | $z_5$ |
| 35mm | IV A | 26.34 | 2.5 | 49.36 | 6.50 | 10.00 |
| 50mm | IV B | 26.34 | 2.5 | 41.36 | 18.50 | 10.00 |
| 75mm | None | 26.34 | 2.5 | 36.86 | 39.0 | 0 |
| 100mm | IV C | 26.34 | 2.5 | 33.36 | 26.75 | 12.57 |
| 175mm | IV D | 26.34 | 2.5 | 28.36 | 30.50 | 15.16 |

Wherein $Z_n$ is the axial spacing between lenses and between the film and the nearest lens surface.

UNITED STATES PATENT OFFICE
CERTIFICATE OF CORRECTION

Patent No. 3,609,012      Dated September 28, 1971

Inventor(s) Chan Street      -4-

It is certified that error appears in the above-identified patent and that said Letters Patent are hereby corrected as shown below:

Signed and sealed this 24th day of October 1972.

(SEAL)
Attest:

EDWARD M. FLETCHER, JR.      ROBERT GOTTSCHALK
Attesting Officer      Commissioner of Patents